US010310489B2

(12) United States Patent
Iijima

(10) Patent No.: US 10,310,489 B2
(45) Date of Patent: Jun. 4, 2019

(54) SERVO CONTROLLER

(71) Applicant: FANUC CORPORATION, Minamitsuru-gun, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/882,041

(22) Filed: Jan. 29, 2018

(65) Prior Publication Data
US 2018/0224830 A1 Aug. 9, 2018

(30) Foreign Application Priority Data

Feb. 6, 2017 (JP) ................... 2017-019710

(51) Int. Cl.
G05B 19/416 (2006.01)
G05B 19/404 (2006.01)
G05B 19/414 (2006.01)
G05B 19/39 (2006.01)

(52) U.S. Cl.
CPC .......... G05B 19/416 (2013.01); G05B 19/39 (2013.01); G05B 19/404 (2013.01); G05B 19/414 (2013.01)

(58) Field of Classification Search
CPC .... G05B 19/416; G05B 19/39; G05B 19/404; G05B 19/414
See application file for complete search history.

(56) References Cited

U.S. PATENT DOCUMENTS

| 6,903,528 | B2 | 6/2005 | Komiya | |
| 2002/0022903 | A1* | 2/2002 | Krah | G05B 13/024 700/170 |
| 2004/0245959 | A1 | 12/2004 | Komiya | |
| 2014/0371916 | A1* | 12/2014 | Nagaoka | B23Q 15/013 700/275 |
| 2016/0033959 | A1* | 2/2016 | Iijima | G05B 11/011 318/561 |
| 2016/0282841 | A1* | 9/2016 | Ishii | G05B 19/404 |

FOREIGN PATENT DOCUMENTS

| JP | 8-123553 | 5/1996 |
| JP | 2003-79174 | 3/2003 |

* cited by examiner

Primary Examiner — Jorge L Carrasquillo
(74) Attorney, Agent, or Firm — Wenderoth, Lind & Ponack, L.L.P.

(57) ABSTRACT

A servo controller includes a speed command creation unit, a torque command creation unit, a speed detection unit, a speed control loop, a speed control gain, a sinusoidal disturbance input unit, an actual frequency characteristics calculation unit, a reference characteristics changing unit, a reference frequency characteristics calculation unit, and a control gain adjustment unit. The sinusoidal disturbance input unit changes a frequency sequentially, a reference frequency characteristics calculation unit calculates reference frequency characteristics for characteristics designated by the reference characteristics changing unit sequentially for respective frequencies, the actual frequency characteristics calculation unit calculates actual frequency characteristics of a control system sequentially for respective frequencies, and the reference frequency characteristics calculation unit stores a characteristic formula of the reference characteristics changing unit when the reference frequency characteristics and the actual frequency characteristics match most closely.

1 Claim, 7 Drawing Sheets $$\frac{b_0}{a_1 s + a_0} \quad - (1)$$

$$\frac{b_1 s + b_0}{a_2 s^2 + a_1 s + a_0} \quad - (2)$$

SERVO CONTROLLER

This application is based on and claims the benefit of priority from Japanese Patent Application No. 2017-019710, filed on 6 Feb. 2017, the content of which is incorporated herein by reference.

BACKGROUND OF THE INVENTION

Field of the Invention

The present invention relates a servo controller used in a machine tool having a feed axis driven by a servo motor.

Related Art

Conventionally, in a servo controller, a technology of automating a procedure of modeling machine characteristics is known. Patent Document 1, for example, discloses this type of technology. Patent Document 1 describes a model determining method of giving a transfer function of so-called test mode analysis in advance and automatically determining one rigid body mode and a number of resonance modes in a technology of providing a scheme for fitting machine characteristics to an N-inertia system. There are many examples of technologies related to a method for estimating such a transfer function.

Patent Document 1: Japanese Unexamined Patent Application, Publication No. 2003-79174

SUMMARY OF THE INVENTION

Even when a servo controller is adjusted on the basis of a reference model that reflects machine characteristics of a machine tool, the control characteristics of the servo controller may change before and after a loading object on the machine tool is changed. In this respect, in the technology disclosed in Patent Document 1, although curve fitting of the frequency characteristic is performed with respect to open-loop characteristics, it is difficult to obtain the open-loop characteristics by sequential calculation within a control loop. A modeling procedure in an open loop is effective when adjusting a resonance avoiding filter and all control gains from their initial state. However, it is meaningless to model all resonance and antiresonance characteristics with respect to a feed axis which has already been subjected to servo adjustment. This is because a controller only has a finite number of resonance avoiding filters due to limitation in calculation capability of a digital signal processor (DSP), and the filters cannot cope with all resonance modes with respect to such machine characteristics in which countless resonance modes are distributed.

An object of the present invention is to provide a servo controller in which a control gain is automatically adjusted appropriately so that control characteristics are maintained even when a loading object is changed and a machine configuration is changed.

(1) A servo controller of the present invention is a servo controller (for example, a servo controller 10 to be described later) used in a machine tool (for example, a machine tool 1 to be described later) having a feed axis (for example, a transfer mechanism 2 to be described later) driven by a servo motor (for example, a servo motor 3 to be described later), including: a speed command creation unit (for example, a speed command creation unit 11 to be described later) that creates a speed command value of the servo motor; a torque command creation unit (for example, a torque command creation unit 12 to be described later) that creates a torque command value of the servo motor; a speed detection unit (for example, a speed detection unit 13 to be described later) that detects a speed of the servo motor; a speed control loop (for example, a speed control loop 30 to be described later) formed by the speed command creation unit, the torque command creation unit, and the speed detection unit; a speed control gain (for example, a speed control gain 14 to be described later) which is a control gain of the speed control loop; a sinusoidal disturbance input unit (for example, a sinusoidal disturbance input unit 15 to be described later) that performs sinusoidal sweeping on the speed control loop; an actual frequency characteristics calculation unit (for example, an actual frequency characteristics calculation unit 16 to be described later) for estimating a gain and a phase of an input/output signal of the speed control loop from an output of the speed control loop when a sinusoidal wave was input to the speed control loop; a reference characteristics changing unit (for example, a reference characteristics changing unit 17 to be described later) that changes a characteristic formula that characterizes reference frequency characteristics of the speed control loop; a reference frequency characteristics calculation unit (for example, a reference frequency characteristics calculation unit 18 to be described later) that calculates reference frequency characteristics for characteristics designated by the reference characteristics changing unit; and a control gain adjustment unit (for example, a control gain adjustment unit 19 to be described later) that adjusts a speed control gain on the basis of an actual frequency response calculated by the actual frequency characteristics calculation unit and the reference frequency characteristics calculated by the reference frequency characteristics calculation unit, wherein the sinusoidal disturbance input unit changes a frequency sequentially, the reference frequency characteristics calculation unit calculates the reference frequency characteristics for the characteristics designated by the reference characteristics changing unit sequentially for respective frequencies, and the actual frequency characteristics calculation unit calculates actual frequency characteristics of a control system sequentially for respective frequencies, and the reference frequency characteristics calculation unit stores the characteristic formula of the reference characteristics changing unit when the reference frequency characteristics and the actual frequency characteristics match most closely.

(2) In the servo controller according to (1), the reference frequency characteristics calculation unit may determine the characteristic formula of the reference frequency characteristics with respect to the actual frequency characteristics before adjustment of the control gain by sequential calculation, the characteristic formula being expressed as one rigid body mode and at least one 2-inertia mode.

According to the servo controller of the present invention, it is possible to realize a configuration in which a control gain is automatically adjusted appropriately so that control characteristics are maintained even when a loading object is changed and a machine configuration is changed.

DETAILED DESCRIPTION OF THE INVENTION

Hereinafter, a servo controller that controls a servo motor of a machine tool having a feed axis will be described as a preferred embodiment of the present invention with reference to the drawings.

Figure 1:
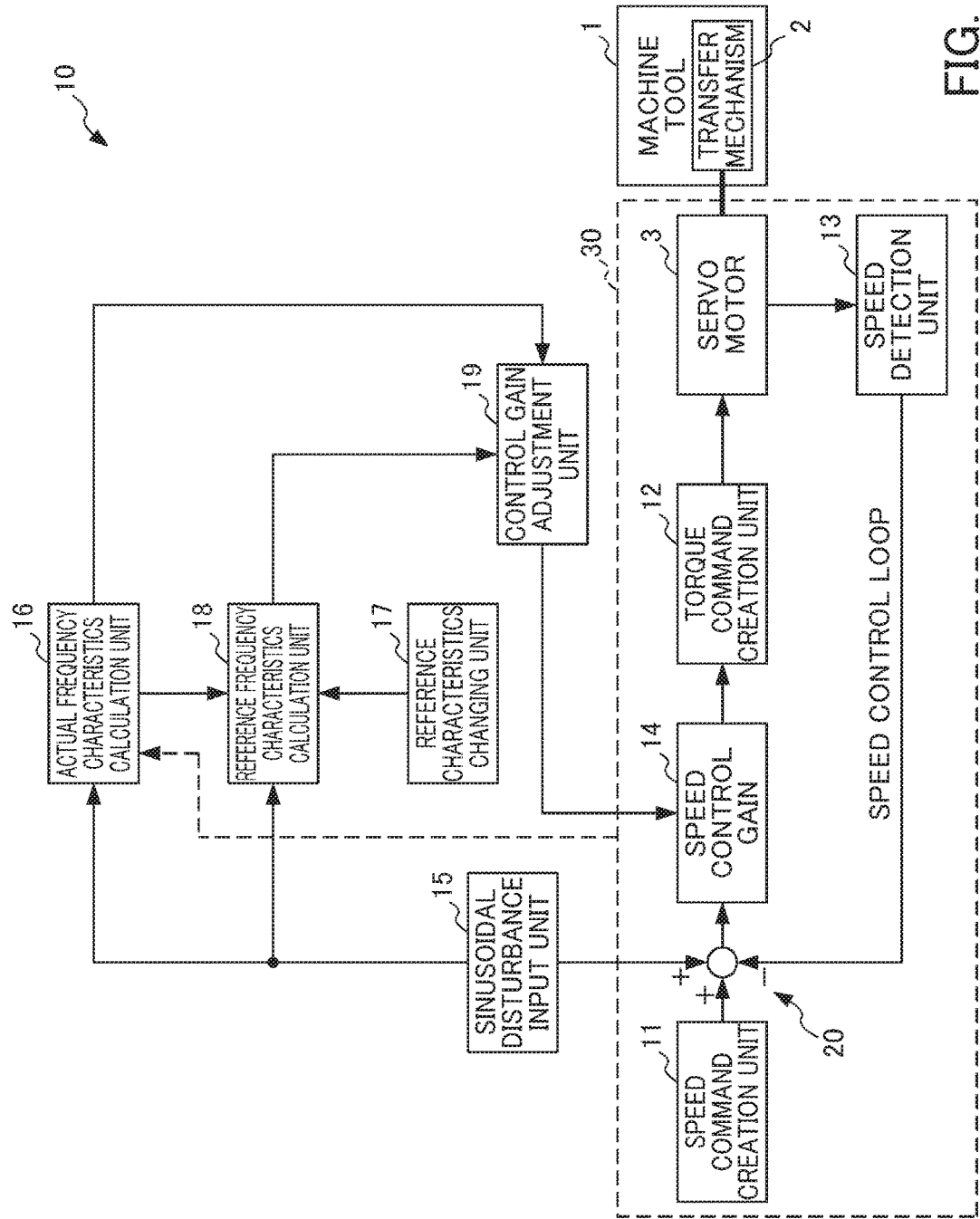
FIG. 1 is a block diagram illustrating a configuration of a servo controller according to an embodiment of the present invention.

FIG. 1 is a block diagram illustrating a configuration of a servo controller 10 according to an embodiment of the present invention. The servo controller 10 of the present embodiment controls a servo motor 3 that operates a driver (not illustrated) of a machine tool 1 via a transmission mechanism (a feed axis) 2. For example, the transmission mechanism 2 is a ball screw and the driver is a table that is operated by the ball screw.

Next, a configuration of the servo controller 10 will be described. As illustrated in FIG. 1, the servo controller 10 includes a speed command creation unit 11, a torque command creation unit 12, a speed detection unit 13, a speed control loop 30, an adder 20, a speed control gain 14, a sinusoidal disturbance input unit 15, an actual frequency characteristics calculation unit 16, a reference characteristics changing unit 17, a reference frequency characteristics calculation unit 18, and a control gain adjustment unit 19.

The speed command creation unit 11 creates a speed command value for driving the servo motor 3. The speed command value created by the speed command creation unit 11 is output to the adder 20.

The torque command creation unit 12 creates a torque command value for the servo motor 3. The servo motor 3 is driven on the basis of the torque command value created by the torque command creation unit 12.

The speed detection unit 13 detects speed of the servo motor 3 as a speed detection value. The speed detection value is calculated on the basis of a measurement value measured by an encoder provided in the servo motor 3, for example.

The speed control loop 30 includes the speed command creation unit 11, the torque command creation unit 12, and the speed detection unit 13.

In the adder 20, the speed detection value detected by the speed detection unit 13 is subtracted from the speed command value created by the speed command creation unit 11, and sinusoidal disturbance created by the sinusoidal disturbance input unit 15 that performs sinusoidal sweeping on the speed control loop 30 is added. The frequency of the sinusoidal disturbance input unit 15 is changed sequentially.

The speed control gain 14 sets a control gain to be multiplied with the calculation result obtained by the adder 20. In the present embodiment, the torque command value is created by the torque command creation unit 12 on the basis of the control gain set by the speed control gain 14 and the calculation result obtained by the adder 20.

The control gain of the speed control gain 14 is adjusted by an adjustment value set by the control gain adjustment unit 19. The control gain adjustment unit 19 sets the adjustment value for adjusting the speed control gain 14 on the basis of a calculation result obtained by the actual frequency characteristics calculation unit 16 and a calculation result obtained by the reference frequency characteristics calculation unit 18.

Sinusoidal disturbance is input from the sinusoidal disturbance input unit 15 to the actual frequency characteristics calculation unit 16 and the reference frequency characteristics calculation unit 18. The actual frequency characteristics calculation unit 16 estimates the gain and the phase of an input/output signal of the speed control loop 30 from the output of the speed control loop 30 when the sinusoidal disturbance was input to the speed control loop 30 of the servo controller 10. Furthermore, the actual frequency characteristics calculation unit 16 expresses the output of the speed control loop 30 using a Fourier series which has an arbitrary number of terms and which uses the frequency of disturbance input from the sinusoidal disturbance input unit 15 as a fundamental frequency and calculates the amplitude and the phase of a fundamental wave component of the Fourier series to thereby calculate the frequency characteristics online. The frequency characteristics calculated by the actual frequency characteristics calculation unit 16 are transmitted to the control gain adjustment unit 19.

The reference characteristics changing unit 17 changes a characteristic formula that characterizes the reference frequency characteristics of the speed control loop 30. The characteristic formula is set according to machine characteristics or the like of the machine tool 1 (see FIGS. 8 to 11 to be described later).

The reference frequency characteristics calculation unit 18 calculates reference frequency characteristics for the characteristics designated by the reference characteristics changing unit 17 sequentially for respective frequencies. In the reference frequency characteristics calculation unit 18, the actual frequency characteristics and the reference frequency characteristics input from the actual frequency characteristics calculation unit 16 are compared, and the characteristic formula of the reference characteristics changing unit 17 when the reference frequency characteristics and the actual frequency characteristics match most closely is stored.

The reference frequency characteristics calculation unit 18 has means for determining the characteristic formula of the reference frequency characteristics with respect to the actual frequency characteristics before adjustment of the control gain by sequential calculation, the characteristic formula being expressed as only one rigid body mode and at least one 2-inertia mode.

Next, a reference characteristics self-generation function of the servo controller 10 of the present embodiment will be described. The reference characteristics self-generation function is a function of determining a reference model for automatic adjustment by online sequential calculation. With this function, when gain readjustment is performed with respect to the transfer mechanism (a feed axis) 2 of the machine tool 1 on which control adjustment has already been performed, the characteristics before the gain readjustment is performed are regarded as reference characteristics and gain readjustment is automatically executed online. This gain readjustment is performed at a timing at which a machining object or a jig is changed (a loading object is changed) or a machine configuration is changed.

Figure 2:
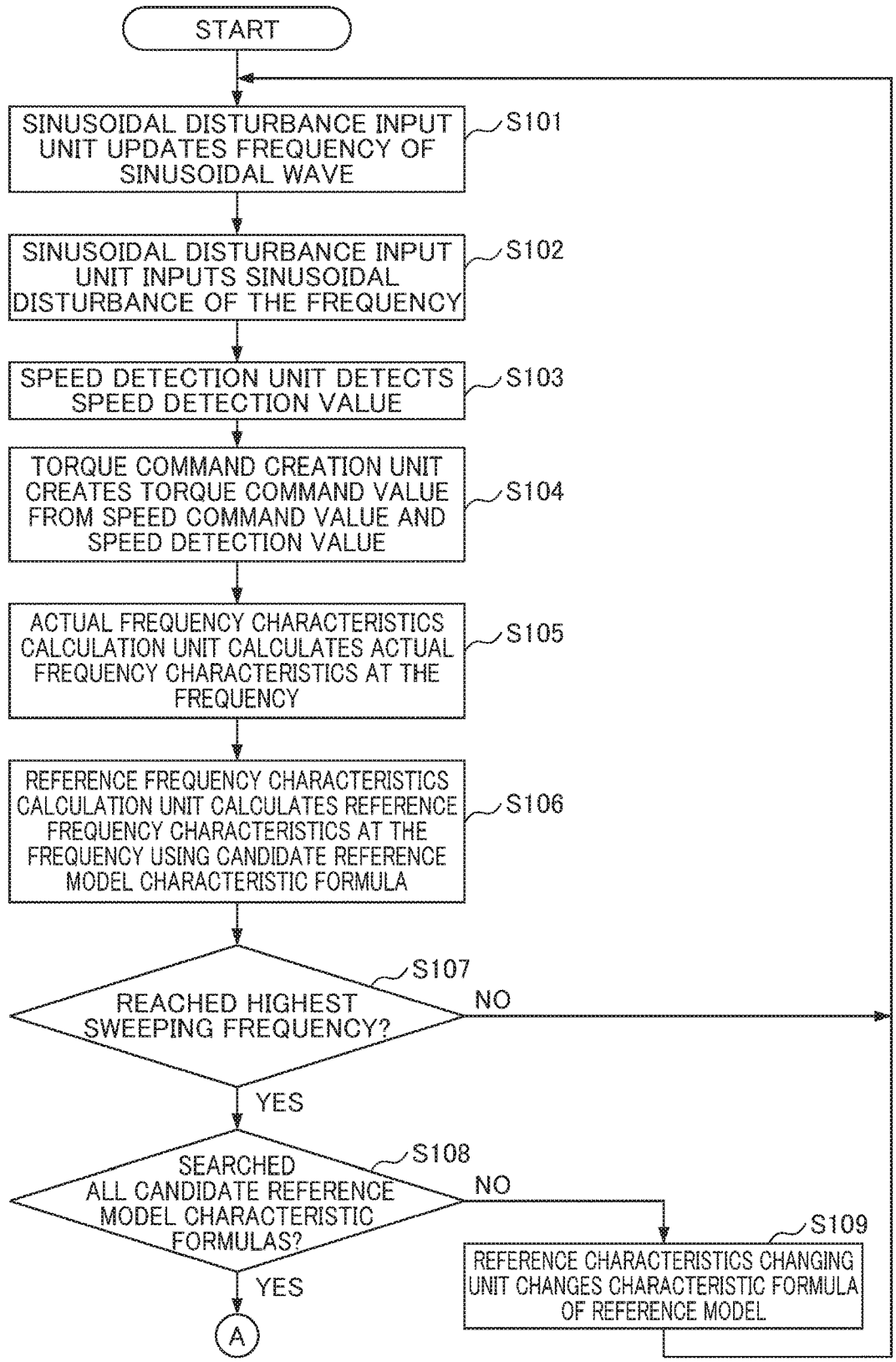
FIG. 2 is a flowchart illustrating a first half of a process of self-generating a reference model by a servo controller according to the present embodiment.
Figure 3:
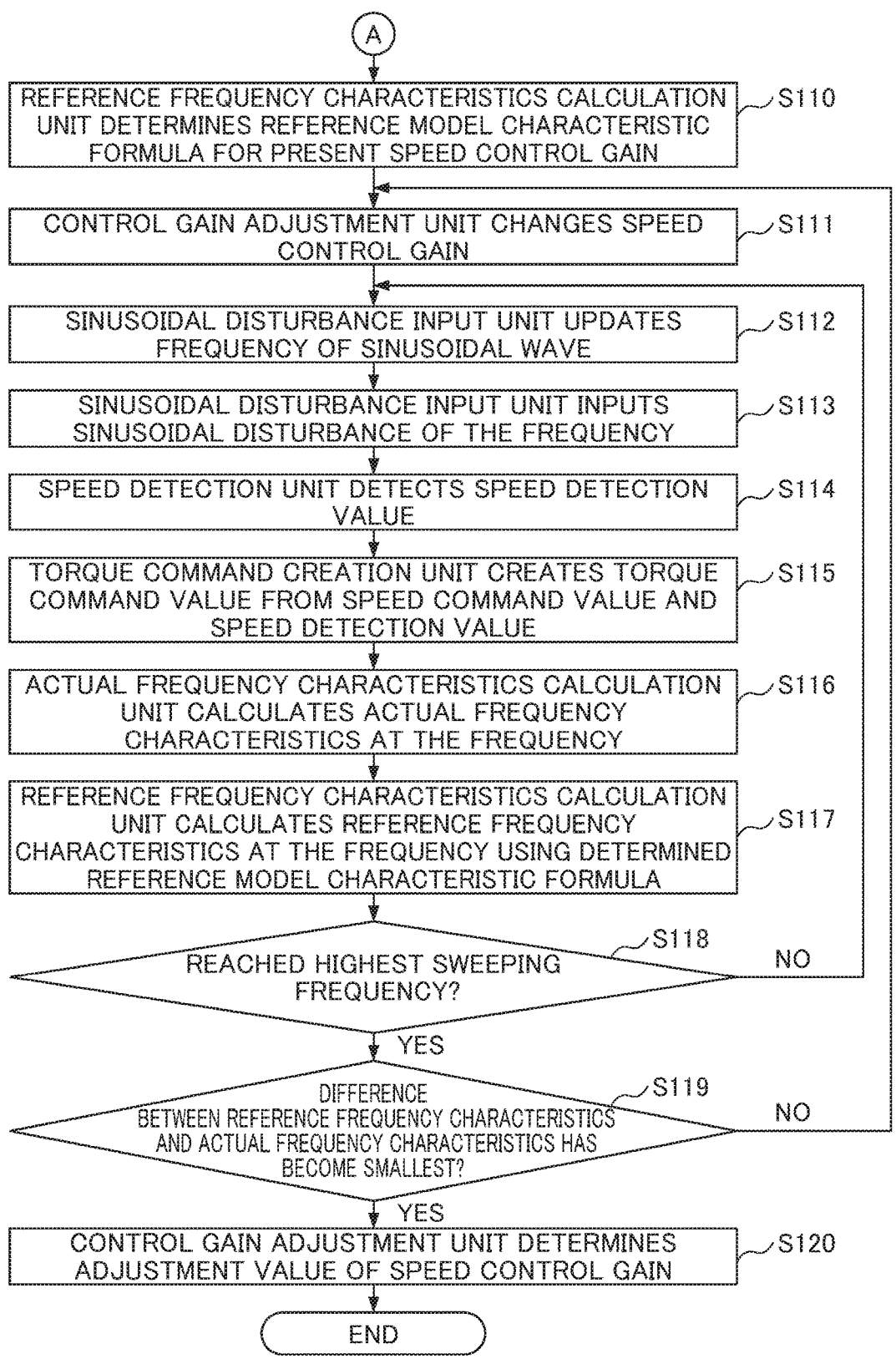
FIG. 3 is a flowchart illustrating a second half of the process of self-generating a reference model by the servo controller according to the present embodiment.

FIGS. 2 and 3 are flowcharts illustrating a process of self-generating a reference model by the servo controller 10 of the present embodiment.

As illustrated in FIG. 2, when an automatic adjustment process starts, the sinusoidal disturbance input unit 15 updates the frequency of a sinusoidal wave (step S101) and inputs sinusoidal disturbance of the updated frequency (step S102). Moreover, the speed detection unit 13 detects a speed detection value (step S103), and the torque command creation unit 12 performs a process of creating a torque command value on the basis of the speed command value and the speed detection value (step S104).

The actual frequency characteristics calculation unit 16 calculates actual frequency characteristics at the frequency (step S105), and the reference frequency characteristics calculation unit 18 calculates reference frequency characteristics at the frequency using a candidate reference model characteristics formula (step S106).

Subsequently to the process of step S106, the servo controller 10 determines whether a highest sweeping frequency has been reached (step S107). When the highest sweeping frequency has been reached, the flow proceeds to a process of determining whether all candidate reference model characteristics formulas have been searched (step S108). When it is determined in step S107 that the highest sweeping frequency has not been reached, the flow returns to the process of step S101 and the processes subsequent to step S101 are performed again.

When it is determined in step S108 that all candidate reference model characteristics formulas have not been searched, the flow proceeds to a process in which the reference characteristics changing unit changes the characteristic formula of the reference model (step S109). When the process of step S109 is completed, the flow returns to the process of step S101 and the processes subsequent to step S101 are performed again.

When it is determined in step S108 that all candidate reference model characteristics formulas have been searched, the flow proceeds to a process in which the reference frequency characteristics calculation unit 18 determines a reference model characteristics formula for the present speed control gain 14 (step S110 in FIG. 3). In the process of step S110, a higher priority order is set to a lower-order characteristic formula.

Figure 4:
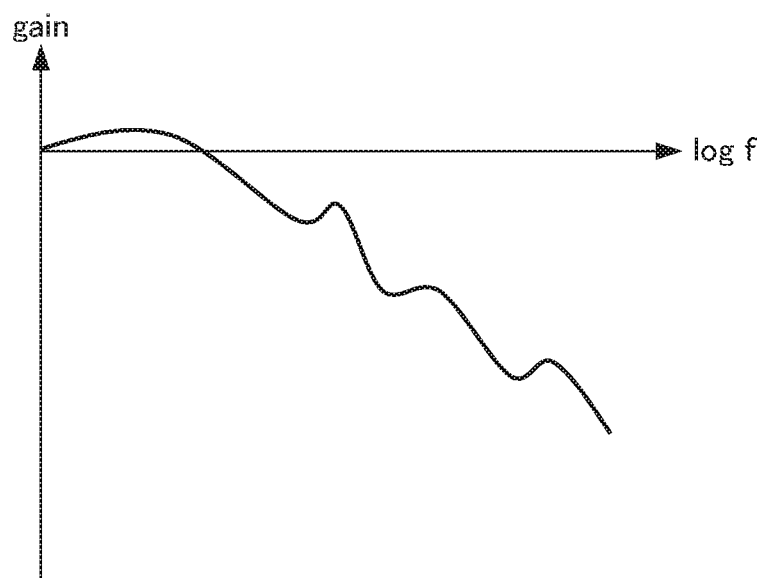
FIG. 4 is an explanatory diagram (Bode diagram) illustrating frequency characteristics before a loading object of a machine tool to which the servo controller of the present embodiment is applied is changed (before a control gain is changed).
Figure 5:
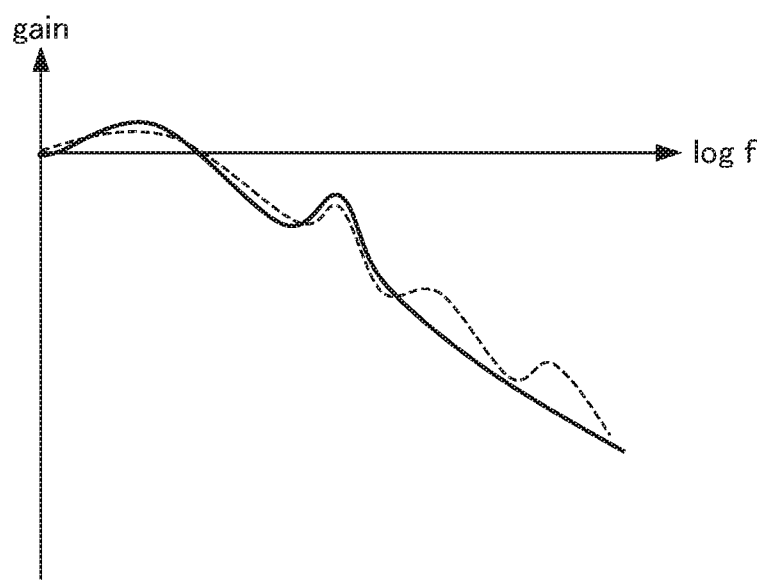
FIG. 5 is an explanatory diagram (Bode diagram) illustrating how reference model characteristics are determined from a state before a loading object of a machine tool to which the servo controller of the present embodiment is applied is changed.

FIG. 4 is an explanatory diagram illustrating frequency characteristics before a loading object of the machine tool 1 to which the servo controller 10 of the present embodiment is applied is changed (before a control gain is changed). FIG. 5 is an explanatory diagram illustrating how reference model characteristics are determined from a state before a loading object of the machine tool 1 to which the servo controller 10 of the present embodiment is applied is changed. The characteristic formula is set so as to correspond to machine characteristics (for example, resonance characteristics) before a loaning object is changed. For example, the reference model illustrated in FIG. 5, matching the resonance having the frequency characteristics before the loading object is changed, illustrated in FIG. 4 is determined from the candidate reference model characteristics formulas. In FIG. 5, the frequency characteristics before the control gain is changed are indicated by a broken line.

Subsequently to the process of step S110, the control gain adjustment unit 19 changes the speed control gain 14 (step S111). After the control gain adjustment unit 19 changes the speed control gain 14 in the process of step S111, the sinusoidal disturbance input unit 15 updates the frequency of the sinusoidal wave (step S112) and inputs sinusoidal disturbance of the frequency (step S113). The speed detection unit 13 detects a speed detection value (step S114), and the torque command creation unit 12 performs a process of creating a torque command value from the speed command value and the speed detection value (step S115).

Figure 6:
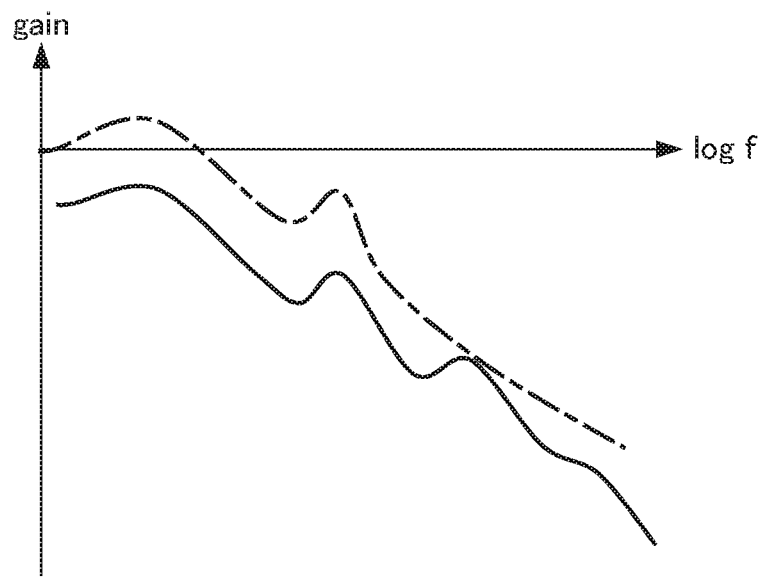
FIG. 6 is an explanatory diagram (Bode diagram) illustrating frequency characteristics in a state in which readjustment of a control gain of a machine tool to which the servo controller of the present embodiment starts.

FIG. 6 is an explanatory diagram illustrating frequency characteristics in a state in which readjustment of a control gain of the machine tool 1 to which the servo controller 10 of the present embodiment starts. Subsequently to the process of step S115, the actual frequency characteristics calculation unit 16 calculates the actual frequency characteristics at the frequency (step S116). For example, the actual frequency characteristics illustrated in FIG. 6 are calculated.

The reference frequency characteristics calculation unit 18 calculates the reference frequency characteristics at the frequency using the determined reference model characteristics formula (step S117). Subsequently to step S117, the servo controller 10 determines whether the highest sweeping frequency has been reached (step S118). When it is determined in step S118 that the highest sweeping frequency has not been reached, the flow returns to the process of step S112 and the processes subsequent to step S112 are performed again.

When it is determined in step S118 that the highest sweeping frequency has been reached, it is determined whether a difference between the reference frequency characteristics and the actual frequency characteristics has become the smallest (S119). When it is determined in step S119 that the difference between the reference frequency characteristics and the actual frequency characteristics has not become the smallest, the flow returns to the process of step S111 and the processes subsequent to step Sill are performed again.

Figure 7:
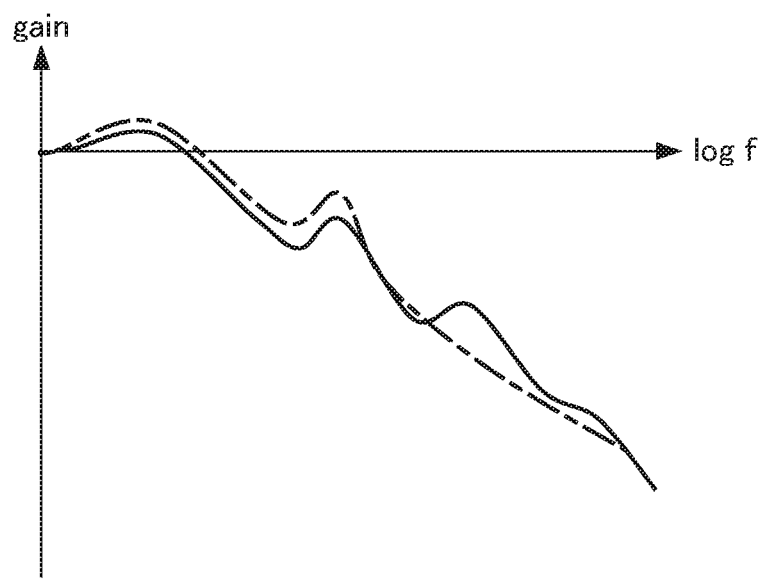
FIG. 7 is an explanatory diagram (Bode diagram) illustrating frequency characteristics after a loading object of a machine tool to which the servo controller of the present embodiment is applied is changed (after a control gain is changed).
Figure 8:
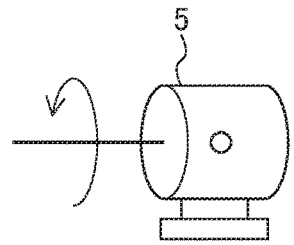
FIG. 8 is an explanatory diagram illustrating a 1-inertia system model which uses a 1st-order characteristic formula.
Figure 9:
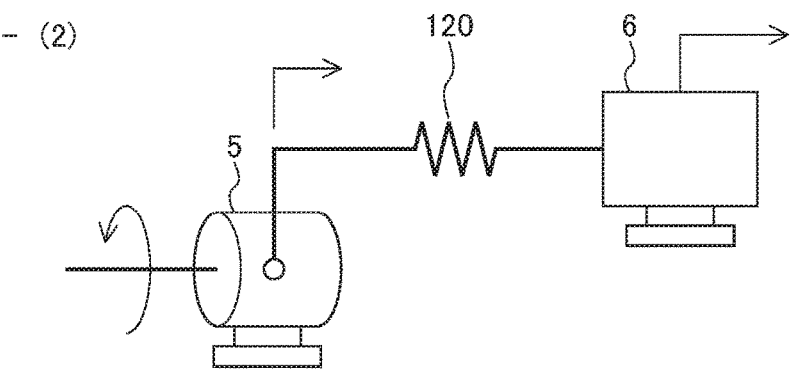
FIG. 9 is an explanatory diagram illustrating a 2-inertia system model which uses a 2nd-order characteristic formula.

FIG. 7 is an explanatory diagram illustrating frequency characteristics after a loading object or the machine tool 1 to which the servo controller 10 of the present embodiment is applied is changed (after a control gain is changed). When it is determined in step S119 that the difference between the reference frequency characteristics and the actual frequency characteristics has become the smallest, the control gain adjustment unit 19 determines the adjustment value of the speed control gain 14 (step S120), and the process ends. As illustrated in FIG. 7, adjustment of the control gain is completed in a form of corresponding to the reference characteristics, and as a result, the control characteristics before and after the loading object is changed are maintained. Next, an example of a characteristic formula that determines the reference characteristics will be described with reference to FIGS. 8 to 11. The following symbols are used in FIGS. 8 to 11. S: Laplace operator; $a_0$: a constant term for the nominator polynomial; $a_1$: primary coefficient of nominator polynomial; $a_2$: 2nd-order coefficient of nominator polynomial; $a_3$: 3rd-order coefficient of nominator polynomial; $a_4$: 4th-order coefficient of nominator polynomial; $b_0$: constant term of denominator polynomial; $b_1$: 1st-order coefficient of denominator polynomial; $b_2$: 2nd-order coefficient of denominator polynomial; $b_3$: 3rd-order coefficient of denominator polynomial FIG. 8 is an explanatory diagram illustrating a 1-inertia system model which uses a 1st-order characteristic formula. FIG. 8 illustrates a rigid body 5 of a rotating system. As illustrated in Equation (1) in FIG. 8, in a so-called rigid body model where the control target is assumed to be a rigid body, a characteristic formula is a 1st-order equation. FIG. 9 is an explanatory diagram illustrating a 2-inertia system model which uses a 2nd-order characteristic formula. FIG. 9 illustrates a load 120 disposed between the rigid body 5 of a rotating system and a movable body 6 of a translating system. As illustrated in Equation (2) FIG. 9, in a 2-inertia system model, a characteristic formula is a 2nd-order equation.

Figure 10:
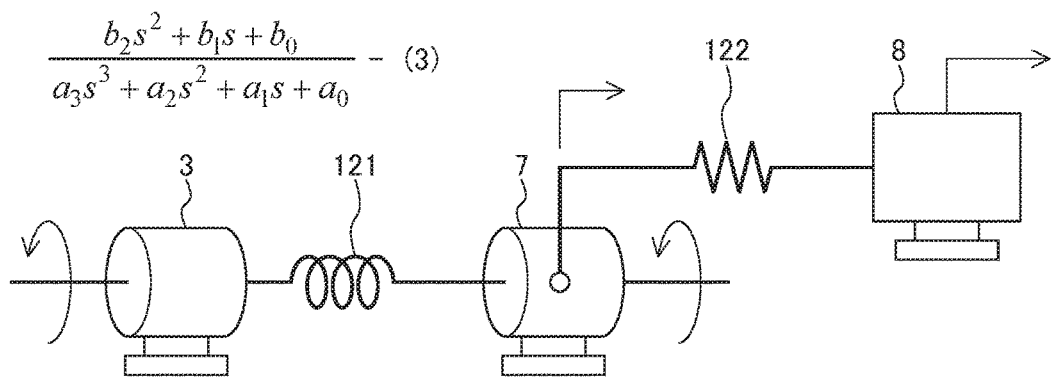
FIG. 10 is an explanatory diagram illustrating a 3-inertia system model which uses a 3rd-order characteristic formula.
Figure 11:
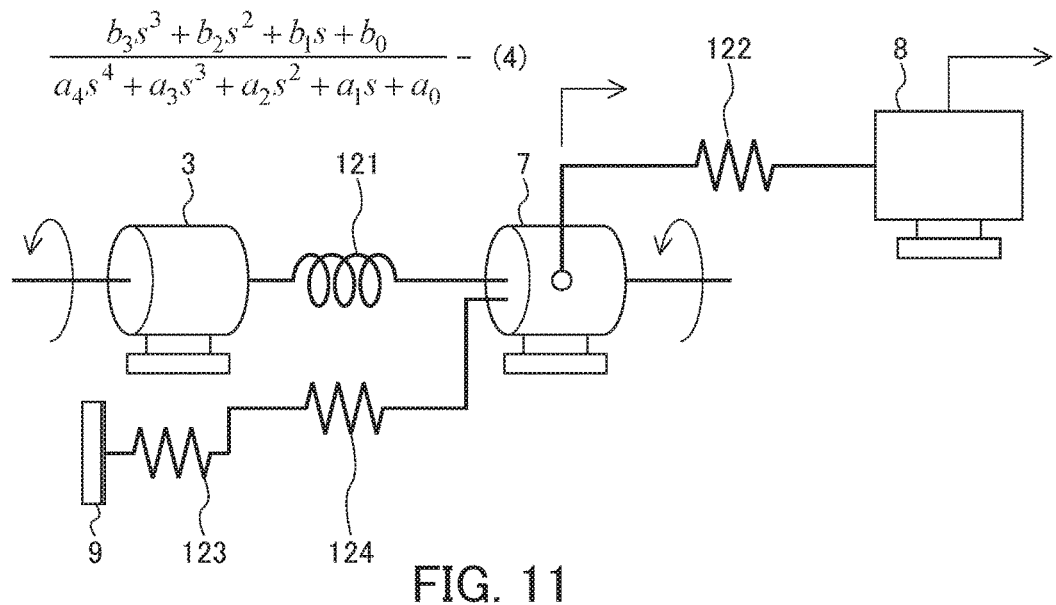
FIG. 11 is an explanatory diagram. illustrating a 4-inertia system model which uses a 4th-order characteristic formula.

FIG. 10 is an explanatory diagram illustrating a 3-inertia system model which uses a 3rd-order characteristic formula. FIG. 10 illustrates a servo motor 3 which is a driving source, a ball screw 7 driven by the servo motor, and a table 8 connected to the ball screw 7. Moreover, a spring 121 as a load is disposed between the servo motor 3 and the ball screw 7, and a spring 122 as a load is disposed between the ball screw 7 and the table 8. As illustrated in Equation (3) in FIG. 10, in a 3-inertia system model, a characteristic formula is a 3rd-order equation. FIG. 11 is an explanatory diagram illustrating a 4-inertia system model which uses a 4th-order characteristic formula. In FIG. 11, a stand 9 is connected to the ball screw 7 in addition to the configuration of FIG. 10. Springs 123 and 124 as loads are disposed between the stand 9 and the ball screw 7. As illustrated in Equation (4) in FIG. 11, in a 4-inertia system model, a characteristic formula is a 4th-order equation.

As illustrated in FIGS. 8 to 11, a characteristic formula of the reference model can be generally expressed as a linear N-inertia model. By setting the order of a characteristic formula based on a physical model according to the machine characteristics, it is possible to give reference characteristics by taking control stability (resonance) into consideration. Generally, there is a tendency that a low-order characteristic formula is suitable for a small apparatus configuration, and a high-order characteristic formula is suitable for a large apparatus configuration having a large number of components. The characteristic formulas illustrated in FIGS. 8 to 11 are examples, and 5th or higher-order inertia system models may be included in candidate characteristic formulas.

In the present embodiment, the characteristic formula is selected from the rigid body mode and the 2-inertia mode illustrated in FIG. 8. The 2-inertia mode is expressed in a sense that the 2-inertia mode includes two types of inertia in the models illustrated in FIGS. 10 and 11 as well as the example of the model illustrated in FIG. 9.

The present embodiment described above has the following configuration. A servo controller 10 of the present embodiment includes a speed command creation unit 11, a torque command creation unit 12, a speed detection unit 13, a speed control loop 30, a speed control gain 14, a sinusoidal disturbance input unit 15, an actual frequency characteristics calculation unit 16, a reference characteristics changing unit 17, a reference frequency characteristics calculation unit 18, and a control gain adjustment unit 19. The sinusoidal disturbance input unit 15 changes a frequency sequentially, a reference frequency characteristics calculation unit 18 calculates reference frequency characteristics for characteristics designated by the reference characteristics changing unit 17 sequentially for respective frequencies, the actual frequency characteristics calculation unit 16 calculates actual frequency characteristics of a control system sequentially for respective frequencies, and the reference frequency characteristics calculation unit 18 stores a characteristic formula of the reference characteristics changing unit when the reference frequency characteristics and the actual frequency characteristics match most closely.

In this way, when the reference characteristics are compared with the frequency characteristics calculated sequentially while changing the pair of parameters of the reference model sequentially, since the pair of parameters when the difference between the reference characteristics and the actual characteristics remains, it is possible to obtain close-loop characteristics directly by sequential calculation in a control loop. That, is, an operation of expressing characteristics before a loading object is changed as the reference model using a characteristic formula is executed online (on a real-time basis), the criteria for automatic adjustment of the gain are determined clearly, and adjustment for changing the control gain sequentially is performed so that the characteristics of the actual response match the reference characteristics determined by the characteristic formula. In this way, it is possible to automatically adjust the gain while maintaining the control characteristics regardless of the configuration of a machine and a change in a loading object.

In the present embodiment, the reference frequency characteristics calculation unit 18 determines the characteristic formula of the reference frequency characteristics with respect to the actual frequency characteristics before adjustment of the control gain by sequential calculation, the characteristic formula being expressed as one rigid body mode and at least one 2-inertia mode.

In this way, the automatic adjustment of the gain can be limited to a rigid body mode and the most important 2-inertia mode, and the reference model can be generated efficiently in a form of ignoring non-important resonance.

While the preferred embodiment of the present invention has been described, the present invention is not limited to the above-described embodiment and may be changed appropriately. For example, the speed control loop 30 is illustrated as an example, the configuration itself of the speed control loop 30 is not important, and the part surrounded by a broken line illustrated in FIG. 1 may be grasped as one system having an input/output relation.

EXPLANATION OF REFERENCE NUMERALS

1: Machine tool
2: Transmission mechanism (Feed axis)
3: Servo motor
10: Servo controller
11: Speed command creation unit
12: Torque command creation unit
13: Speed detection unit
14: Speed control gain.
15: Sinusoidal disturbance input unit
16: Actual frequency characteristics calculation unit
17: Reference characteristics changing unit
16: Reference frequency characteristics calculation unit
19: Control gain adjustment unit
30: Speed control loop

What is claimed is:

1. A servo controller used in a machine tool having a feed axis driven by a servo motor, comprising:
   a speed command creation unit that creates a speed command value of the servo motor;
   a torque command creation unit that creates a torque command value of the servo motor;
   a speed detection unit that detects a speed of the servo motor;

a speed control loop formed by the speed command creation unit, the torque command creation unit, and the speed detection unit;

a speed control gain which is a control gain of the speed control loop;

a sinusoidal disturbance input unit that performs sinusoidal sweeping on the speed control loop;

an actual frequency characteristics calculation unit for estimating the gain and a phase of an input/output signal of the speed control loop from an output of the speed control loop when a sinusoidal wave was input to the speed control loop;

a reference characteristics changing unit that changes a characteristic formula that characterizes reference frequency characteristics of the speed control loop;

a reference frequency characteristics calculation unit that calculates reference frequency characteristics for characteristics designated by the reference characteristics changing unit; and a control gain adjustment unit that adjusts the speed control gain on the basis of an actual frequency response calculated by the actual frequency characteristics calculation unit and the reference frequency characteristics calculated by the reference frequency characteristics calculation unit, wherein the sinusoidal disturbance input unit changes a frequency sequentially, the reference frequency characteristics calculation unit calculates the reference frequency characteristics for the characteristics designated by the reference characteristics changing unit sequentially for respective frequencies, and the actual frequency characteristics calculation unit calculates actual frequency characteristics of a control system sequentially for respective frequencies, the reference frequency characteristics calculation unit stores the characteristic formula of the reference characteristics changing unit when the reference frequency characteristics and the actual frequency characteristics match most closely, and the reference frequency characteristics calculation unit determines the characteristic formula of the reference frequency characteristics with respect to the actual frequency characteristics before adjustment of the control gain by sequential calculation, the characteristic formula being expressed as one rigid body mode and at least one 2-inertia mode.

* * * * *